United States Patent Office 3,448,091
Patented June 3, 1969

3,448,091
MOLECULAR WEIGHT CONTROL IN THE POLYMERIZATION OF VICINAL EPISULFIDES
Riad H. Gobran, Levittown, Pa., and Anthony F. Santaniello, Trenton, and Roy Larsen, Lambertville, N.J., assignors to Thiokol Chemical Corporation, Bristol, Pa., a corporation of Delaware
No Drawing. Filed Feb. 21, 1966, Ser. No. 528,823
Int. Cl. C08g 23/00
U.S. Cl. 260—79                        13 Claims

ABSTRACT OF THE DISCLOSURE

By incorporating in the polymerization reaction mixture a small amount of certain compounds containing one or more "active" hydrogens during the polymerization of vicinal episulfides, it is possible to control the molecular weight of the resultant normally solid poly(vicinal episulfides). Among the various active hydrogen-containing compounds which may be used to control the molecular weight of the polymer during the polymerization of vicinal episulfides are water, hydrogen sulfide, lower alkanols, glycols, amines, amides, mercaptans, and carboxylic acids.

---

The present invention relates to a novel process for the preparation of sulfur containing polymers. More particularly, the present invention relates to a process whereby sulfur containing polymers may be prepared and wherein the molecular weight of the polymers may be regulated.

An object of the present invention is to provide a process whereby the molecular weight of polymers formed primarily from alkylene sulfide (i.e., vicinal episulfide) monomers may be readily regulated so as to provide, at will, polymers having various desired molecular weights.

The term alkylene sulfide, or vicinal episulfide, as used herein means a compound containing the structure

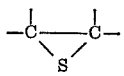

Examples of such monomers are ethylene sulfide; propylene sulfide; 1,2-butylene sulfide; 2,3-butylene sulfide; isobutylene sulfide; cyclohexene sulfide; vinylcyclohexane episulfide; vinylcyclohexene episulfide; styrene sulfide; paramethylstyrene episulfide; butadiene monoepisulfide; 2-benzyl thiirane; 1,2-epoxy-3,4-epithiobutane; allyl thioglycidyl ether, thioglycidyl acrylates, and thioglycidyl alkacrylates such as thioglycidyl methacrylate. Such monomers contain 2 to about 10 carbon atoms. Polymers made from a major portion, i.e., >50 mol percent, of episulfide monomers, such as, ethylene sulfide, isobutylene sulfide, cyclohexene sulfide, styrene sulfide and paramethyl styrene episulfide tend to be thermoplastic in nature whereas polymers made from a major portion of the other above listed episulfide monomers tend to be elastomeric in nature. The polymers are useful in the molding arts for the preparation of a variety of molded articles therefrom in the form of film, fiber, rods, pipe, tubing, sheets and other profiles. The molded articles can be prepared using a variety of molding techniques known to those in the art including compression, injection and extrusion molding procedures.

Many catalysts have been known to polymerize alkylene sulfide monomers. The catalysts which tend to produce solid polymers which would have the most usefulness in applications requiring thermoplastic or elastomeric polymers are those catalysts based on the heavy metals such as the Group IIB metals zinc, cadmium and mercury.

One of the difficulties involved in the use of a catalytically induced polymerization, however, is the fact that such processes do not provide for the production of polymers having different average molecular weights. For various applications it is desirous to use polymers of different molecular weights. Moreover, in the case of polymers made with certain classes of catalysts based on the Group IIB metals, the molecular weights of some of the resulting thermoplastic polymers tend to be so high as to limit the use of such materials in conventional molding equipment. Prior to the advent of the present invention, no procedure was known whereby the molecular weight of alkylene sulfide polymers could be readily regulated with any one polymerization catalyst although the concept of polymerizing such monomers with a variety of catalysts has been known to the art for a number of years.

It has now been found that the molecular weight of a polymer formed from at least a major amount of alkylene sulfide monomers can be readily regulated so as to provide polymers having various molecular weights if the polymer is formed by polymerizing the monomer charge with the catalyst in the presence of an active hydrogen containing molecular weight regulator or control agent. By regulating the amount of the molecular weight control agent used in the polymerization system the molecular weight of the resulting polymer can be adjusted accordingly. The molecular weight control agent may be used in amounts of 0.005 to 10 parts by weight per 100 parts by weight of monomer being polymerized depending on the desired polymeric molecular weight.

The molecular weight control agent may be organic or inorganic in nature. It must contain hydrogen in the form of OH, SH, NH$_2$, NH, CONH$_2$ or COOH. The preferred of such materials is water since it provides substantially greater reproducibility of results over a wider molecular weight range. Other materials which may be used include hydrogen sulfide; monofunctinoal alcohols, such as methanol, ethanol, isopropanol, n-butanol; glycols, such as ethylene glycol, propylene glycol, diethylene glycol; amines such as methyl amine, ethyl amine, diethyl amine, ethylene diamine, n-butyl amine, di(n-butyl)amine; amides, such as acetamide; mercaptans, such as, n-butyl mercaptan, mercaptoethanol and carboxylic acids such as acetic acid.

The polymerization reaction of the present invention may be conducted in vapor phase, in bulk or in the presence of a solvent. Where a solvent is used it should be inert, i.e., not contain active hydrogen. Examples of useful solvents in this regard are aliphatic and aromatic hydrocarbons such as benzene, toluene, xylene, n-hexane, octane, isopentane, petroleum ether, mineral oil and heptane; oxygenated solvents such as tetrahydrofuran, dioxane, dioxolane and diethyl ether; halogenated solvents such as methylene chloride, chloroform, ethylene chloride and carbon tetrachloride.

The polymerization reaction may be conducted at temperatures of 20 to 120° C. and at pressures which may be at, below, or above atmospheric pressure. The reaction may take 1 to 48 hours depending on the size and type of monomer charge and the reaction conditions being employed.

The catalysts which may be used in conjunction with the M.W. control agents of the present invention are many and are preferably those based on the Group IIB (Mendeleev Periodic Table) metals. The most desirable of these catalysts, since the use of them tends to aid in the production of polymers having the most reproducible and highest molecular weights, are those catalysts which are the reaction product of two components. One of these components is an organometallic compound of the Formula R$_2$M wherein R is alkyl or aryl and M is a metal of Group IIB of the periodic system, i.e., zinc, cadmium or mercury.

The second component, which is reacted with the organometallic component to form the catalyst, can be generally characterized as an electron donor compound having at least one pair of unshared electrons. However, all substances falling within this broad genus do not appear to be operative. One relatively large sub-genus that has been found to be operative comprises compounds having an active hydrogen atom including, for example, water; hydrogen sulfide; primary and secondary alkylamines; e.g., methyl, ethyl and diethyl amines; alkanols, e.g., mercaptoethanol, acetone; lower fatty acids, e.g., acetic acid; and aldehydes, e.g., butyraldehyde. In addition to this sub-genus, i.e., the compounds having an active hydrogen, it has been found that useful catalysts can be prepared employing as the second component or co-catalyst elemental oxygen or sulfur, carbonyl sulfide and carbon disulfide. The preferred catalyst is the reaction product of diethylzinc and water. The preparation of these composite catalysts is described more fully in co-pending U.S. Ser. No. 357,300 filed Apr. 3, 1964, now Patent No. 3,365,429.

These composite catalysts can be conveniently prepared by reacting the two components described above in a suitable inert liquid reaction medium, e.g., benzene, hexane, tetrahydrofuran, petroleum ether or mineral oil. The molar ratio of co-catalyst to organometallic component is preferably in the range 0.5:1 to 3:1, with the optimum ratio usually being about 1:1. The reaction temperature does not appear to be particularly critical and may vary from say −20° C. to 100° C., with the preferred range being 20° to 50° C. It is evident that in some cases the boiling point of the liquid reaction medium will determine the upper temperature limit.

To insure optimum catalyst activity the catalyst should be freshly prepared and used as soon as possible after its preparation. In some cases it will be found desirable to prepare the catalyst in the polymerization reaction vessel just prior to the initiation of the polymerization reaction. If it is necessary to store the catalyst for an appreciable period of time before it is used, say 48 hours or more, the activity of the catalyst can best be maintained by storage at a reduced temperature. Since the preparation of the composite catalysts as well as the conducting of the polymerization procedures according to the present invention is influenced by the presence of water it is essential to sart with dry raw materials and solvents and add thereto the desired amounts of water or other active hydrogen containing materials to reproducibly obtain the desired regulated molecular weights in the polymer products. Catalyst preparation and polymerization are desirably carried out, therefore, in an atmosphere of inert gas such as nitrogen, helium or argon. It has been found that, in general, commercial available grades of the catalyst components can be used. The liquid reactiton medium used should desirably be either dried over sodium or freshly distilled.

Other catalysts, which are more simple in structure, which may be used according to the present invention to prepare alkylene sulfide polymers include cadmium compounds such as hydroxides, sulfides, silicates, chromates, adipates, sulfates and carbonates as disclosed in U.S. application S.N. 255,675 filed Feb. 1, 1963 now abandoned; zinc or mercury compounds such as peroxides, sulfides, chromates, adipates, oxalates, oxides, hydroxides and carbonates, as disclosed in U.S. application S.N. 269,774 filed Apr. 1, 1963 now abandoned; carbonates of zinc, manganese, lead, cadmium, cobalt and nickel as disclosed in U.S. application S.N. 213,015 filed July 27, 1962; oxides of metals having a valence of not greater than IV which fall into period 3, groups IA, IIA, and IIIA; period 4, groups IA, IIA and VIII; period 5, groups IIA, IVA and VA; and period 6, groups IIA, IVA and VA of the periodic table of the elements. These oxides include $Na_2O$, $Na_2O_2$; $MgO$; $Al_2O_3$; $K_2O$, $K_2O_2$; $CaO$; $Fe_2O_3$; $CoO$; $NiO$; $SrO$, $SrO_2$; $SnO$, $SnO_2$; $Sb_2O_3$; $BaO$, $BaO_2$; $PbO$, $PbO_2$ and $Bi_2O_3$, as disclosed in U.S. application S.N. 269,772 filed Apr. 1, 1963 now Patent No. 3,281,399.

The polymers produced with the catalysts described above tend to be fine particle sized, fluffy powders which are difficult to handle and manipulate, particularly during the molding operations customarily employed therewith. Moldable homopolymers and interpolymers of a more granular nature and which have better handling properties may be produced using a "seed catalyst" technique. In the "seed catalyst" procedure as disclosed in S.N. 484,749, filed Sept. 2, 1965 now Patent No. 3,402,154, a catalyst, such as the composite catalysts described above, is used to polymerize the episulfide monomer charge in solution at room temperature. About 0.05 to 10 mol percent catalyst is used based on the monomer charge. The solvents used are those such as tetrahydrofuran, petroleum ether, benzene and toluene. The conversion is proportional to the amount of catalyst used and the polymer product contains, combined therewith, all the catalyst initially charged. The fluffy polymer product is then isolated and dried. This product is then compacted to form dense cakes and the cakes are then ground to form particles of less than 20 mesh in size. This granulated polymer product which contains the original catalyst charge is then used as a "seed catalyst" with which to polymerize one or more alkylene sulfides alone or with other monomers to form granular powders. About 1 to 5% by weight of the seed catalyst is used based on the monomer charge.

The polymers produced according to the present invention contain, as noted above, a major portion, i.e., more than 50 mol percent of one or more alkylene sulfide monomers. Such alkylene sulfide monomers would include those listed above as well as others listed in U.S. 3,222,324, U.S. 3,222,325 and U.S. 3,222,326. The polymers may also be formed with a minor amount of one or more other monomers which are not alkylene sulfide monomers but which are copolymerizable therewith. Such other monomers would include cyclic sulfides having the structure

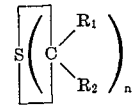

in which $n=3$ to 6, and $R_1$ and $R_2$ may be hydrogen, a branched or linear alkyl group having from 1 to 10 carbon atoms, an aryl, an arylalkyl and/or an alkylaryl group. $R_1$ and $R_2$ may also be heterocyclic, alicyclic, bicyclic or polycyclic. Examples of such cyclic sulfides are trimethylene sulfide, pentamethylene sulfide and hexamethylene sulfide.

Also minor amounts of units derived from various ethylenically unsaturated monomers may also be used in forming the polymers according to the present invention. Such unsaturated monomers include olefins, such as ethylene, propylene, butylene and isobutylene; conjugated and non-conjugated dienes, such as butadiene, isoprene and 1,4 pentadiene; and vinyl compounds, such as styrene, vinyl acetate, ethyl acrylate, methyl acrylate, methyl methacrylate, butyl acrylate acrylonitrile, vinyl isobutyl ether, methyl styrene, hydroxy propyl methacrylate, tetrafluoroethylene, chlorotrifluoroethylene and hexafluoropropylene. Still other compounds that may be used in minor amounts have the structure:

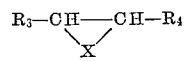

in which X is oxygen or nitrogen and $R_3$ and $R_4$ may be hydrogen, a branched or linear alkyl group having from 1 to 10 carbon atoms, an aryl, an aralkyl and/or an alkylaryl group. $R_3$ and $R_4$ may also be heterocyclic, alicyclic, bicyclic or polycyclic. Examples of such compounds are styrene oxide, ethylene oxide, propylene oxide, 1,2-butylene oxide, 2,3-butylene oxide, ethylene imine and propylene imine. Still other compounds that may be used in minor amount are formaldehyde, trioxane, hydroxyisobutyric acid, tetrahydrofuran, 1,3-dioxolane, 1,4-dioxane, trimethylene oxide, tetramethylene oxide and pentamethylene oxide.

The polymers that may be produced according to the present invention may be homopolymers or interpolymers containing at least a major amount of one or more vicinal episulfides and, optionally, a minor amount of one or more of the other monomers mentioned above. The interpolymers may be graft, random or block interpolymers. The polymers may also be linear or branched.

The molecular weight of a polymer produced according to the present invention may be measured directly by various molecular weight determination procedures. In the case of thermoplastic polymers produced, in particular, from ethylene sulfide using notably Group IIB metal based catalysts the molecular weight and other properties of such polymers, however, makes it exceedingly difficult to ascertain the true molecular weights of such polymers using conventional procedures. In such cases resort is made to comparisons of the melt indices of the various polymers to ascertain their relative molecular weights. Generally, as the molecular weight of a polymer increases its melt index and intercept of such index decreases.

The numerical values of melt index given in the examples set forth below were obtained with a capillary flow plastomer of the type sold by F. F. Slocomb Corporation of Wilmington, Del. The test procedure used conformed generally to ASTM method D–1238–57T. In determining the melt indices, the plugged reservoir of the test instrument was preheated to and maintained at 235° C.±2° C. and then charged with 4 to 8 grams of polymer within a 2 to 4 minute interval depending on the amount charged. A 5-kg. weight was then placed atop the charge by means of a ram and left there for about 2 minutes so that the total elapsed time from the beginning of charging to the unplugging of the orifice was 4 minutes for a 4-gm. charge and 6 minutes for an 8-gm. charge. The 5-kg. weight was then replaced with a 2160-gram weight and the plug was removed from the flow orifice of the reservoir, and the flow of polymer through the orifice was measured. The amounts of polymer which flowed through the orifice during each 1-minute interval were separately collected and weighed to the nearest milligram. The melt index zero intercept values given herein are those obtained by approximating the melt-index flow curve by a straight line on a plot of log flow rate v. time after unplugging the orifice, and noting the rate obtained according to this straight line at the time of unplugging the orifice (zero time).

The stability of the alkylene sulfide polymers produced according to the present invention, under the rigorous molding temperatures commonly employed when molding such relatively high melting materials, can be improved by admixing with the polymers, as a stabilizer, about 0.5 to 2.5% by weight of the polymer of one or more nitrogen containing stabilizers. The stabilizer can be incorporated in the polymer by mechanically mixing it with the polymer in powder form. Stabilization of such polymers with such stabilizers is disclosed in application Ser. No. 267,605 filed Mar. 25, 1963, now abandoned; application Ser. No. 267,604 filed Mar. 25, 1963, now abandoned; application Ser. No. 312,847 filed Oct. 1, 1963, now abandoned; application Ser. No. 323,074 filed Nov. 12, 1963, now abandoned; application Ser. No. 349,799 filed Mar. 6, 1964, now abandoned, and application Ser. No. 477,288 filed Aug. 4, 1965.

The following examples are merely illustrative of the present invention and are not intended as a limitation upon the scope thereof.

Examples 1–8

(A) Preparation of seed catalyst.—Under a nitrogen atmosphere the following reactants were added, in the order presented, into a 2½ gallon solution bottle: 2835 ml. of tetrahydrofuran and sufficient diethyl zinc in heptane solution to effect a 1:1 mol ratio with 9.838 ml. of water added subsequent to the diethyl zinc. The materials were agitated by sparging with nitrogen. Into a second vessel, a clean dry reactor, purged with nitrogen, was added 51.9 pounds of petroleum ether followed by 6.49 pounds of ethylene sulfide. The temperature of the reactor was then adjusted to 78±2° F. and the entire above prepared solution of tetrahydrofuran, diethyl zinc and water added. The reactor was then agitated for one hour at the above temperature. The polymer thus produced was centrifuged out and subsequently dried for 3 hours at 160 to 180° F. under reduced pressure. The dried polymer was then compacted and pulverized to pass through a #40 screen. A yield of 1.3 pounds of seed catalyst polymer was thereby obtained.

(B) Preparation of granular polymers using water as a molecular weight regulating agent.—In the following examples, reactors were charged successively under a nitrogen atmosphere with 400 ml. of Lactol Spirits (aliphatic petroleum fraction, B.P. 205–225° C.) 100 ml. of ethylene sulfide, 3.11 grams of the seed polymer catalyst prepared as in Part A above and the amount of tetrahydrofuran-water solution indicated in Table I. Each ml. of tetrahydrofuran solution contained 0.10 ml. of water. The reactors were capped and heated to about 80° C. and retained at this temperature for about 2 hours. The resultant polymers formed during this reaction were filtered off and dried under reduced pressure. The polymers were each stabilized by mixing with one part by weight of $$(HOCH_2CH_2NHCH_2CH_2)_2NH$$

per hundred parts by weight of polymer before the determination of melt index data was made. Table I shows the melt index data of the stabilized polymers. Example 1 served as a control sample since no molecular weight regulating agent was added.

TABLE I

| Example | THF [1] (ml.) | Water (ml.) (in the THF) | Melt index (zero intercept) |
|---|---|---|---|
| 1 | 0 | 0 | 0.006 |
| 2 | 1.25 | 0.125 | 0.03 |
| 3 | 2.5 | 0.25 | 0.05 |
| 4 | 3.0 | 0.30 | 0.07 |
| 5 | 3.5 | 0.35 | 0.16 |
| 6 | 4.0 | 0.40 | 0.30 |
| 7 | 5.0 | 0.50 | 0.80 |
| 8 | 10 | 1.00 | 3.3 |

[1] THF—10% by volume of water in tetrahydrofuran.

The increase in zero intercept values of the polymers produced in Examples 2 to 8 as compared to the corresponding value for the polymer produced in Example 1 indicates that water can be used as a molecular weight regulator as disclosed herein. The melt index data was obtained at 235° C.

Examples 9–11

In the following examples, reactors were charged under a nitrogen atmosphere with 100 ml. of ethylene sulfide in 400 ml. of Lactol Spirits. The amount of seed catalyst indicated in Table II and prepared as in Part A of Examples 1–8 was added. As a molecular weight regulating agent, the amount and type of glycol indicated in Table II was also added. Example 1 shown in Table I served as a control since no molecular weight regulating agent was added. The reactors were capped and heated to 80° C. and held at that temperature for two hours. The resultant polymer products were removed from the reactors, filtered off and dried under reduced pressure. These polymers were stabilized as in Examples 1–8. Table II shows the melt index data for the resulting stabilized polymers.

TABLE II

| | Example | | |
|---|---|---|---|
| | 9 | 10 | 11 |
| Diethylene glycol (ml.) | 1.0 | 2.0 | |
| Ethylene glycol (ml.) | | | 1.0 |
| Seed polymer catalyst (g.) | 3.11 | 3.11 | 2.70 |
| Melt index (zero intercept) | 0.10 | 0.20 | 0.058 |

The increase in zero intercept values (at 235° C.) of the polymers produced in Examples 9–11 as compared to the corresponding value for the polymer produced in Example 1 indicates that glycols can be used as molecular weight regulators as disclosed herein.

Examples 12 and 13

The reactants, as listed below, were charged to a stainless steel bomb in an atmosphere of nitrogen and the capped bombs were maintained at 80° C. for two hours. The resulting polymers were recovered by filtration and drying under vacuum. The ethylene sulfide polymer formed in the presence of water (Example 13) had a lower molecular weight than the ethylene sulfide polymer formed in the absence of water (Example 12). This is indicated by the larger zero intercept as determined from melt index studies at 235° C. on the polymers stabilized with one part by weight of zinc oxide and two parts by weight of $(H_2NCH_2CH_2NHCH_2C_6H_4)_2O$ per hundred parts by weight of polymer, as described in Ser. No. 477,288 filed Aug. 4, 1965.

|  | Example No. | |
|---|---|---|
|  | 12 | 13 |
| Ethylene sulfide (cc.) | 100 | 10 |
| Toluene (cc.) | 400 | 400 |
| $ZnCO_3$ (g.) | 2.50 | 2.50 |
| 10% solution $H_2O$ in THF¹ (cc.) |  | 3.0 |
| Melt index (zero intercept) | 0.40 | 0.90 |

¹ THF signifies tetrahydrofuran.

Examples 14 and 15

The reactants, as listed below, were charged to a stainless steel bomb in an atmosphere of nitrogen and the capped bombs were maintained at 80° C. for two hours. The catalyst solution consisted of a mixture of 100 cc. of tetrahydrofuran, 10 cc. of diethyl zinc solution in heptane (11.1 mmoles Zn) and 0.19 cc. water which were shaken together until the evolution of gas ceased and a yellow color appeared indicating a completion of the reaction of the diethyl zinc and water. The resulting polymers were recovered by filtration and drying under vacuum.

These polymers were stabilized by mixing one hundred parts by weight of polymer with one part by weight of $(H_2NCH_2CH_2NHCH_2C_6H_4)_2O$ and one part by weight of a partially hydrolyzed zinc chloride prepared by slowly adding a solution of 450 g. of zinc chloride in 1 liter of water with agitation to a solution of 340 g. of diethylene-triamine in 1500 ml. of water, washing the resulting white precipitate with water and acetone, followed by drying overnight in a vacuum oven (as in Ser. No. 477,288).

The ethylene sulfide polymer formed in the presence of water (Example 15) had a lower molecular weight than the ethylene sulfide polymer formed in the absence of water. This is indicated by the larger zero intercept of the polymer of Example 15 as determined from melt index studies at 235° C. on the stabilized polymers.

|  | Example No. | |
|---|---|---|
|  | 14 | 15 |
| Ethylene sulfide | 100 | 100 |
| Toluene | 400 | 400 |
| Catalyst solution (cc.) | 10 | 10 |
| 10% solution $H_2O$ in THF¹ (cc.) |  | 3.0 |
| Melt index (zero intercept) | 0.20 | 1.5 |

¹ THF signifies tetrahydrofuran.

Examples 16–23

Several different molecular weight regulators were used in these examples. The catalyst used in all the examples was a seed catalyst polymer prepared as in Part A of Examples 1–8. In each case a clean 30 oz. glass soda bottle was successively charged under nitrogen with 100 g. of freshly distilled ethylene sulfide, 400 ml. of dry benzene, 2.42 grams of seed catalyst (containing 1.11 mmole Zn) and 0.02 mole of the particular molecular weight regulator being employed, where one was employed. The bottles were then capped and heated at 80° C. for two hours. The resulting polymers were then recovered by filtration and dried under vacuum for 16 hours at 50° C. The polymers were stabilized by mixing one hundred parts by weight of polymer with two parts by weight of $(H_2NCH_2CH_2NHCH_2C_6H_4)_2O$ and one part by weight of partially hydrolyzed zinc chloride prepared as described in Examples 14 and 15.

| Example | Molecular weight regulator | Melt index (zero intercept) |
|---|---|---|
| 16 | None | 0.010 |
| 17 | Water | 0.044 |
| 18 | n-Butyl mercaptan | 0.097 |
| 19 | Di(n-butyl) amine | 0.022 |
| 20 | Acetamide | 0.027 |
| 21 | Acetic acid | >8 |
| 22 | Ethylene diamine | 0.120 |
| 23 | n-Butanol | 0.031 |

The increase in zero intercept values of the polymers produced in Examples 17–23 as compared to the corresponding value for the polymer produced in Example 16 indicates that the various molecular weight regulators employed are in fact useful for this purpose.

We claim:

1. In a process for the production of normally solid, high molecular weight poly(vicinal episulfides), in which a monomer reaction mixture containing at least 50 percent of a vicinal episulfide is polymerized in the presence of a catalytic amount of an episulfide polymerization catalyst, the improvement which comprises controlling the molecular weight of the resultant poly(vicinal episulfide) by incorporating in the polymerization reaction mixture from about 0.005 to about 10 percent by weight, based on the weight of the monomer, of an active hydrogen-containing molecular weight control agent selected from the group consisting of hydrogen sulfide, methanol, ethanol, isopropanol, n-butanol, ethylene glycol, propylene glycol, diethylene glycol, methyl amine, ethyl amine, diethylamine, ethylene diamine, n-butyl mercaptan, mercaptoethanol, acetic acid, and water.

2. A process according to claim 1, in which the active hydrogen-containing compound is water.

3. A process according to claim 1, in which the active hydrogen-containing compound is an alkanol selected from the group consisting of methanol, ethanol, isopropanol, and n-butanol.

4. A process according to claim 1, in which the active hydrogen-containing compound is a primary amine containing one or two carbon atoms.

5. A process according to claim 1, in which the active hydrogen-containing compound is a diethyl amine.

6. A process according to claim 1, in which the active hydrogen-containing compound is n-butyl mercaptan.

7. A process according to claim 1, in which the episulfide polymerization catalyst is based on a Group II–B metal compound.

8. A process according to claim 1, in which (a) the episulfide polymerization compound is a zinc compound, and (b) the active hydrogen-containing compound used to control the molecular weight of the poly(vicinal episulfides) is water.

9. A process according to claim 8, in which (a) the episulfide polymerization compound is the reaction product of a zinc dialkyl and water, and (b) the active hydrogen-containing compound used to control the molecular weight of the poly(vicinal episulfide) is water.

10. A process according to claim 8, in which (a) the episulfide polymerization catalyst is zinc carbonate, and (b) the active hydrogen-containing compound used to control the molecular weight of the poly(vicinal episulfide) is water.

11. In a process for the production of normally solid, high molecular weight poly(ethylene sulfide), in which ethylene sulfide is polymerized in the presence of a catalytic amount of an episulfide polymerization catalyst at a temperature in the range between about 20° C. and 120° C., the improvement which comprises controlling the molecular weight of the resultant poly(ethylene sulfide) by incorporating in the polymerization reaction mixture from about 0.005 to about 10 percent by weight of water based on the weight of monomer in the polymerization reaction mixture.

12. A process according to claim 11, in which the episulfide polymerization catalyst is the reaction product of zinc diethyl and water.

13. A process according to claim 11, in which the episulfide polymerization catalyst is zinc carbonate.

References Cited

UNITED STATES PATENTS

| | | | |
|---|---|---|---|
| 3,300,454 | 1/1967 | Osborn | 260—79 |
| 3,317,489 | 5/1967 | Sander | 260—79 |
| 3,317,919 | 5/1967 | Sander | 260—79 |
| 3,317,920 | 5/1967 | Sander | 260—79 |
| 3,324,051 | 6/1967 | Lal | 260—79.7 |
| 3,325,456 | 6/1967 | Adamek et al. | 260—79.7 |
| 3,329,659 | 7/1967 | Gobran et al. | 260—79.7 |
| 3,335,116 | 8/1967 | Rosenthal et al. | 260—79 |

OTHER REFERENCES

Dermer: Copolymers of Olefin Sulfides, WADC Technical Report 55–447, cover page and pp. 10 to 13, ASTIA Document No. 110496.

HOSEA E. TAYLOR, JR., *Primary Examiner.*

M. I. MARQUIS, *Assistant Examiner.*

U.S. Cl. X.R.

260—45.9, 79.7